Patented June 19, 1928.

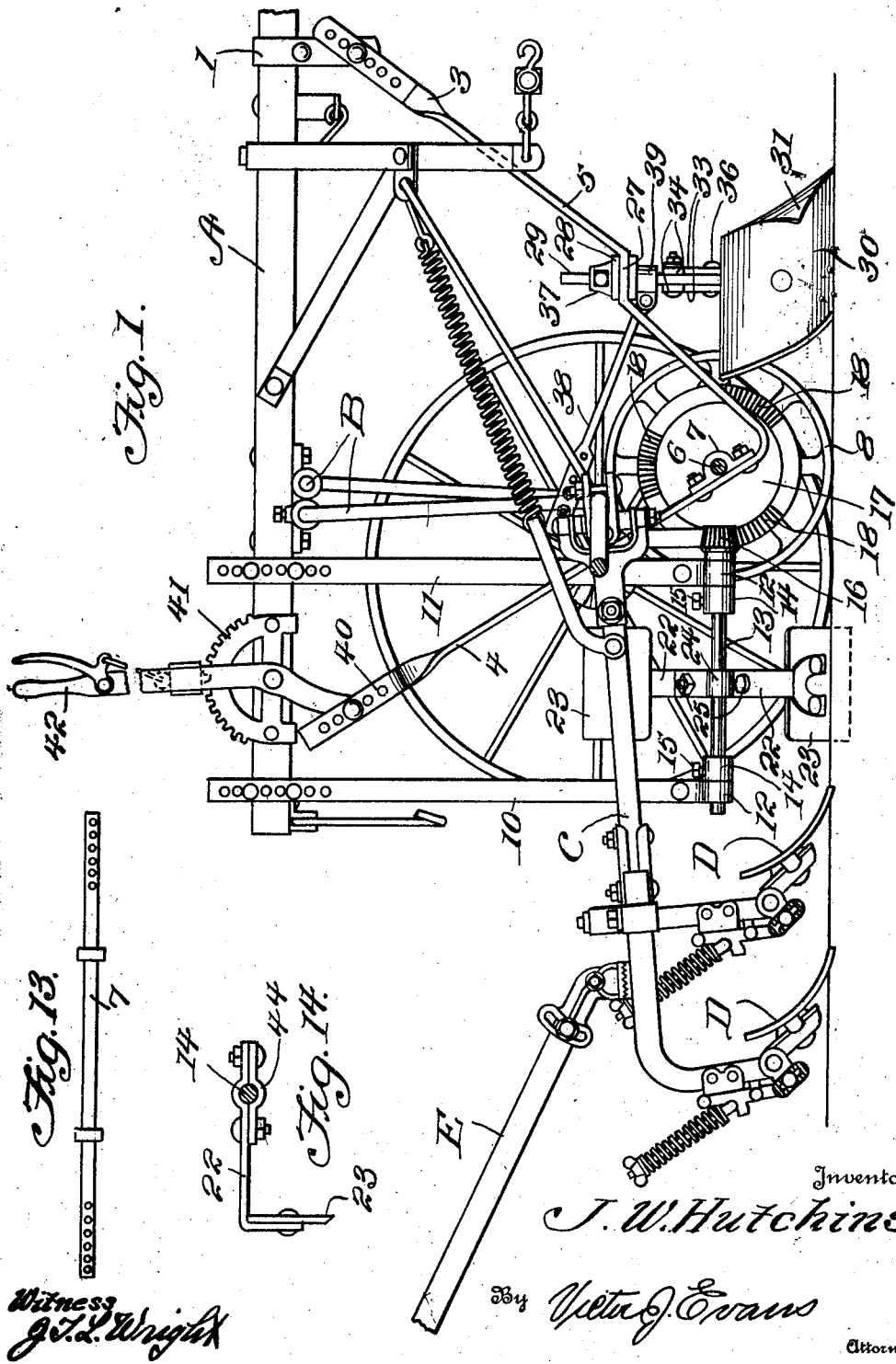

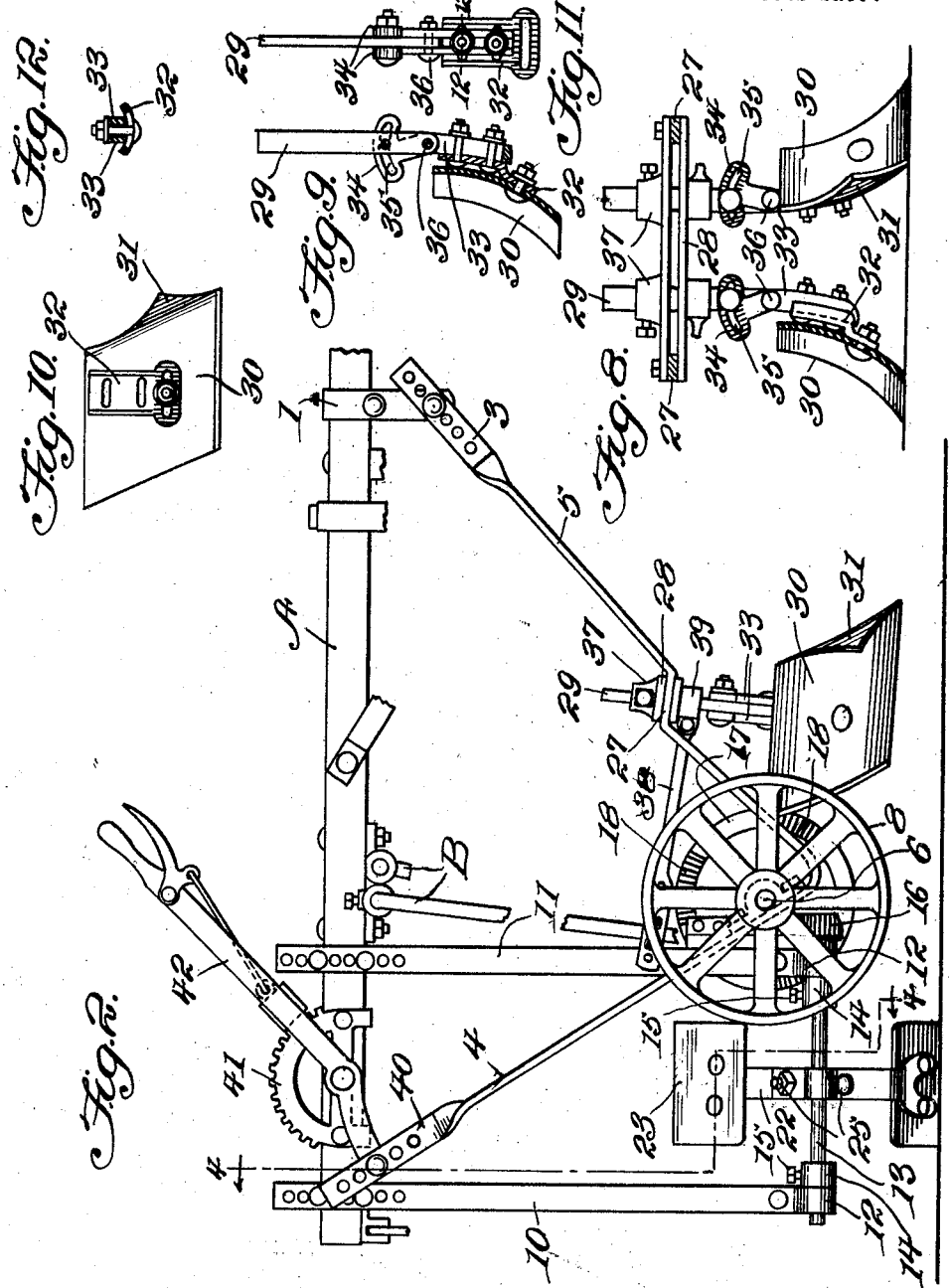

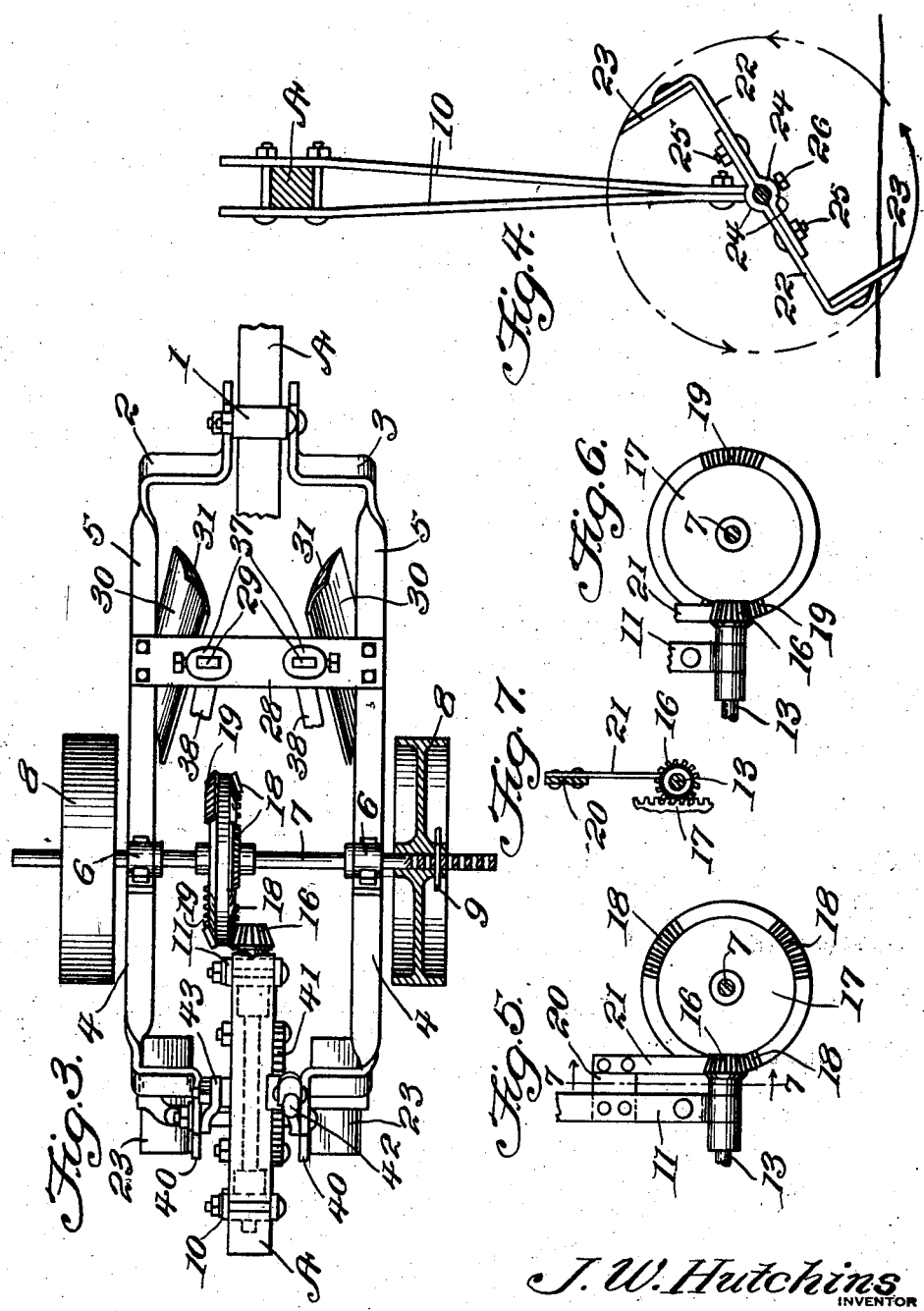

1,674,551

UNITED STATES PATENT OFFICE.

JUNMUS W. HUTCHINS, OF WESLEY, OKLAHOMA.

CHOPPER ATTACHMENT FOR CULTIVATORS.

Application filed August 29, 1927. Serial No. 216,218.

This invention relates to cotton choppers and its primary object is to provide a cotton chopper attachment for a cultivator, that can be associated with various type cultivators and cooperate therewith so that the cotton can be cut or thinned simultaneously with the plowing thereof.

Another object of the invention is to provide a cotton chopper attachment for cultivators that is capable of adjustment and can be timed for chopping out cotton in accordance with the operator's desires.

A further object of the invention is to provide a cotton chopper attachment for cultivators that is capable of being operated independently of the cultivator so that either can be operated accordingly, or simultaneously.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of the attachment forming the subject matter of the present invention and showing the same applied to a cultivator of the walking type.

Figure 2 is a similar view of the attachment per se, and showing fragmentary portions of the cultivator.

Figure 3 is a top plan view of the attachment.

Figure 4 is a sectional view taken approximately on line 4—4 of Figure 2 looking in the direction of the arrows.

Figure 5 is a fragmentary side elevation of the chopping hoe gearing and showing the same applied and arranged for operating the hoes.

Figure 6 is a similar view showing the gears arranged for operating the hoes at different intervals from that shown in Figure 5.

Figure 7 is a sectional view taken approximately on line 7—7 of Figure 5 looking in the direction of the arrows.

Figure 8 is a front elevation of the scrapers and the mounting therefor.

Figure 9 is a sectional view taken through one of the scrapers and its mounting.

Figure 10 is a side view of one of the scrapers.

Figure 11 is a similar view of one of the scraper mountings.

Figure 12 is a sectional view taken approximately on line 12—12 of Figure 11.

Figure 13 is a view of the axle for the attachment.

Figure 14 is a view of a single hoe in applied position.

While I have shown my attachment secured to a cultivator of the walking type it will be obvious that it can be applied to any type cultivator for cooperation therewith in the cultivation of cotton or other like growing crop.

Referring to the drawings in detail the letter A indicates the tongue for the cultivator which includes the usual adjustable arch B secured to the plow beams C which have fixed thereto plows D and associated therewith handles E.

Secured to the tongue A in advance of the arch is a U-shaped bracket 1 which straddles the tongue as shown, and has secured to the depending arms thereof as best shown in Figure 1 of the drawings, the body strips 2 and 3 of the chopper and these body strips are arranged in parallelism, and are substantially V-shaped in formation so as to provide the converging arms 4 and 5 as shown for each strip.

Secured to the arms 4 adjacent the apex of the strips are bearing brackets 6 within which is mounted for rotation a shaft 7 having ground engaging wheels 8 mounted for longitudinal adjustment thereon and these wheels are held in adjusted position through the instrumentality of a pin 9 passing through the hub thereof and anyone of the transverse openings formed in the end portions of the shaft as best shown in Figure 3 of the drawings.

Depending from the tongue and disposed rearwardly of the connection of the arch B therewith are spaced parallel substantially V-shaped members 10 and 11 which have their upper ends adjustably secured to the tongues and their lower ends terminate in bearings 12 within which is mounted a stub shaft 13 having collars 14 adjustably secured thereon through the medium of stud bolts 15. By securing the collars 14 to the stub shaft 13 as shown, it will be apparent that the shaft can be adjusted longitudinally in the bearings and retained at any desired adjusted position therein. Secured to the inner end of the stub shaft is a pinion 16 which is adapted to be arranged in the path of a gear 17 having formed on its opposed faces teeth arranged in groups. It will be noted that one face of the gear 17 has teeth arranged in three groups while the opposed face has its teeth arranged in two groups. The teeth that are arranged in three groups have their groups disposed diagonally with respect to each other, and each of these groups are indicated by the reference numeral 18, and the teeth that are disposed in two groups have their groups disposed diametrically opposite each other as shown in Figure 6, and these groups are indicated by the reference numeral 19.

Secured to the V-shaped member 11 is a forwardly disposed plate 20 which has fixed thereto and depending therefrom a resilient pawl 21. The pawl 21 has its lower end engaging the teeth of the pinion 16 and acts as a means to prevent the rotation of the pinion 16 and shaft 13 thereof when the said pinion is out of mesh with its respective groups of teeth. However, the pawl 21 will not effect the rotation of the shaft when the pinion is in mesh with the teeth, due to the inherent resiliency of the pawl as will be apparent.

The shaft 13 has detachably secured intermediate its ends, the shanks 22 of the hoe blades 23. The shanks 22 have formed adjacent their inner ends semi-circular portions 24 and the semi-circular portion of one of the shanks cooperate with the semi-circular portion of the other shank for receiving the shaft 13 as best shown in Figure 4 of the drawings, and these shanks are fixed to the shaft through the medium of bolt and nut connections 25, while a set screw 26 cooperates with the bolt and nut connections for this purpose. The outer ends of the shanks 22 are bent at right angles to their body portions and have the hoe blades 23 riveted or otherwise secured thereto.

The arms 5 are bent intermediate their ends to provide substantially flat portions 27 to accommodate a cross head 28 which is secured to the flat portions as best shown in Figure 3 of the drawings. Mounted for vertical adjustment in the cross head and arranged in spaced relation with respect to each other are the shanks 29 of scraper blades 30. The scraper blades are of the usual construction and include laterally and outwardly flared corner portions 31. In order to mount the scraper blades for any desired adjustment, it will be noted that these blades have fixed thereto a slotted member 32 curved transversely upon itself as best shown in Figure 12 of the drawings, and secured to the member 32 by bolt and nut connections passing through the slots thereof are links 33 which are provided with enlarged arcuate shape upper ends 34 formed with curved slots 35 to receive a bolt and nut connection which passes through the shanks as suggested in Figures 9 and 11 of the drawings, and the shanks are pivotally secured to the links intermediate their ends as at 36. By this construction, it will be obvious that the scraper blades can be adjusted forwardly, rearwardly, laterally and the angles with respect to each other, and also vertically, due to the slidable movement of the shanks 29 through the cross head 28. The cross head 28 is provided with bearing guides 37, and mounted in the bearing guides as best shown in Figure 8 are set screws for securing the scraper blades in their respective vertical adjusted positions.

The body strips 2 and 3 are substantially braced by arms 38 having one of their ends secured to the arch arms B intermediate their ends while the opposite ends of the arms 38 terminate in bearings 39 which receive the shanks 29 of the scraper blades.

The upper ends of the arms 4 are bent in right angle formation upon themselves so as to dispose the upper terminals thereof in close proximity, and these upper terminals which are indicated by the reference numeral 40 are provided with spaced openings. Passing through the tongue A is a bolt and nut connection which has its bolt also passed through a curved rack bar 41 secured to the tongue as shown, and fixed to one end of the bolt is a hand lever 42 which cooperates with the rack bar through the medium of a pawl engageable with the teeth thereof in the usual manner for adjusting the body strips and elements carried thereby for a purpose which will be apparent. The hand lever has its lower end attached to the upper terminals of one of the arms 4 and secured to the opposite end of the bolt is a link 43 having connection with the terminal of the other arm 4. The hand lever 42 and link 43 are adjustably associated with the respective terminals of the arms 4 and can be arranged in any one of the openings thereof as best shown in Figure 2.

While I have shown two hoes associated with the shaft 13, a single hoe can be secured thereto and arranged thereon as shown in Figure 14 of the drawings, and all that is necessary to do when it is desired to replace a single hoe with a pair of hoes is to remove one of the hoes and its shank and secure a plate 44 to the remaining hoe shank.

From the above description and disclosure of the drawings, it will be obvious that I have provided a cotton chopper that is capable of being adjusted in accordance with the operator's desires so that the cotton can be thinned accordingly, and when it is desired to change the time operation of the hoes, the shaft 7 can be removed from the arms 4 through the medium of its bearing 6 and replaced so that the face of the gear 17 which is secured to said shaft can be disposed so that either group of teeth can be arranged for cooperation with the pinion 16, and when the three groups are disposed with respect to the pinion 16 as shown in Figure 5, it will be obvious that the travel of the hoes will be at greater intervals than when the two groups of teeth are arranged with the pinion as disclosed in Figure 6 of the drawing. The pawl 21 prevents rotation of the pinion during the travel of the gear from one group of teeth to the other so that the cotton or other crop that is being thinned by the apparatus will be so thinned in a uniform manner.

The gear will be disposed out of the path of the pinion 16 when the body strips are raised through the medium of the hand lever 42 and of course the hoes and scraper blades will likewise be disposed to inoperative position, as well as the ground engaging wheels 8, with the result the entire structure can be made inoperative while conveying the chopper to and from places of use as well as in making turns at the ends of rows and the like in a field.

While I have disclosed my chopper associated with a walking cultivator, it can be associated with a tongue in the same manner as disclosed in the drawings and used separate and distinct from a cultivator or other ground working instrument.

While the time of the hoes can be changed by reversing the gear faces, it will also be apparent that when a single hoe is used that the interval of operation thereof will also be varied from the intervals of operation when a pair of hoes are used.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A cotton chopper of the character described comprising a tongue, body strips of V-shaped formation arranged in parallelism and having one of their ends adjustably associated with said tongue, means adjustably secured to the opposite ends of said body strips for raising and lowering the same, means for retaining said body strips in their adjusted positions, a shaft secured to said strips, a gear fixed to said shaft, hoes mounted for rotation, and means between said gear and hoes for operating the latter.

2. An apparatus of the character described comprising a tongue, body strips having one of their ends adjustably secured to said tongue and being formed in substantially V-shaped configuration, a shaft mounted for rotation with respect to said strips, ground engaging wheels secured to said shaft, a gear having teeth disposed upon its opposite faces in varied group formation, members depending from said tongue in parallelism, a shaft mounted in the lower end of said members, chopping means secured to said shaft, and a pinion on said shaft and adapted to cooperate with the groups of teeth on either face of said gear as and for the purpose specified.

3. An apparatus of the character described comprising a tongue, body strips having one of their ends adjustably secured to said tongue, a shaft carried by said body strips and being mounted for rotation, ground engaging wheels secured to said shaft, a gear secured to said shaft intermediate its ends, and having teeth formed in varied group formation on its opposed faces, a second shaft arranged at right angles to the shaft first mentioned, chopping means carried by the second shaft, and a pinion secured to the second shaft and adapted to cooperate with the teeth of the gear for operating the chopping means, means for adjusting said body strips with respect to said tongue, and scraper blades carried by said strips.

4. An apparatus of the character described comprising a tongue, body strips having one of their ends adjustably secured with respect to said tongue, a shaft mounted for rotation and carried by said body strips, ground engaging wheels for said shaft, a gear secured to said shaft intermediate its ends, teeth arranged in varied group formations upon the opposed faces of said gear, a shaft disposed at right angles to the shaft first mentioned and having connection with said tongue, chopping means secured to the second mentioned shaft, means for rotating the second mentioned shaft from the gear, said first mentioned shaft being removable for associating either group of teeth with said means for varying the operation of the chopping means accordingly and means adjustably secured to the opposite ends of said body strips for adjusting the latter.

5. The combination with a cultivator and its tongue, of a cotton chopper associated with the cultivator and carried by its tongue, comprising body strips arranged in substantially V-shaped formation, bearing brackets secured to one of the arms of the body strip adjacent their juncture with the other arms thereof, a shaft mounted for rotation in said bearing brackets, ground engaging wheels adjustably secured to said shaft, a gear carried by said shaft intermediate its ends and being provided with teeth formed on its opposed faces in varied group formation, a second shaft mounted for longitudinal adjustment and at right angles to the shaft first mentioned, chopping means secured to the second mentioned shaft and means for rotating said second mentioned shaft from the gear and from any of the groups of teeth on said gear, and means for adjusting the position of said body strips.

6. The combination with a cultivator and its tongue, of a chopping apparatus of the character described comprising body strips having one of their ends adjustably secured with respect to said tongue, substantially V-shaped members depending from said tongue, a shaft mounted for rotation in the lower ends of said members, chopping means secured to said shaft, means for rotating said shaft at varied intervals and being carried by the body strips, means for adjusting the body strips with respect to said tongue, and adjustable scraper blades secured to said body strips.

7. The combination with a cultivator and its tongue, of a chopping apparatus comprising a pair of body strips disposed in parallelism and having one of their ends adjustably associated with respect to said tongue, means adjustably secured to the opposite ends of said body strips for adjusting the same with respect to said tongue, said means being carried by said tongue, substantially V-shaped members adjustably secured to said tongue and depending in parallelism therefrom, a shaft mounted for rotation in the lower ends of said V-shaped members, chopping means secured to said shaft, means for rotating the shaft at varied intervals and being carried by the body strips, ground engaging wheels for operating said means, and adjustable scraper blades arranged in advance of the chopping means and mounted upon said body strips.

8. A cotton chopper of the character described comprising a tongue, body strips having one of their ends adjustably secured with respect to said tongue, means for adjusting the body strips at desired heights with respect to said tongue and retaining said strips in their adjusted position, hoes mounted for rotation, and means for rotating said hoes at varied intervals and being carried by said body strips.

9. A cotton chopper of the character described comprising a tongue, body strips having one of their ends adjustably secured thereto and being arranged in substantially V-shaped formation, flat portions formed in one of the arms of the body strips, a cross head secured to said flat portions, scraper blades, shanks for said scraper blades and being mounted for adjustment in said cross head, means for adjusting said scraper blades and being secured thereto and the shanks respectively, chopping means disposed in the rear of said scraper blades and being mounted for rotation, means for rotating said chopping means at varied intervals, and means for adjusting said body strips and retaining the same in their respective adjusted positions with respect to said tongue.

In testimony whereof I affix my signature.

JUNMUS W. HUTCHINS.